Feb. 19, 1957   H. E. DARLING   2,782,346
MEASURING APPARATUS
Filed July 16, 1952
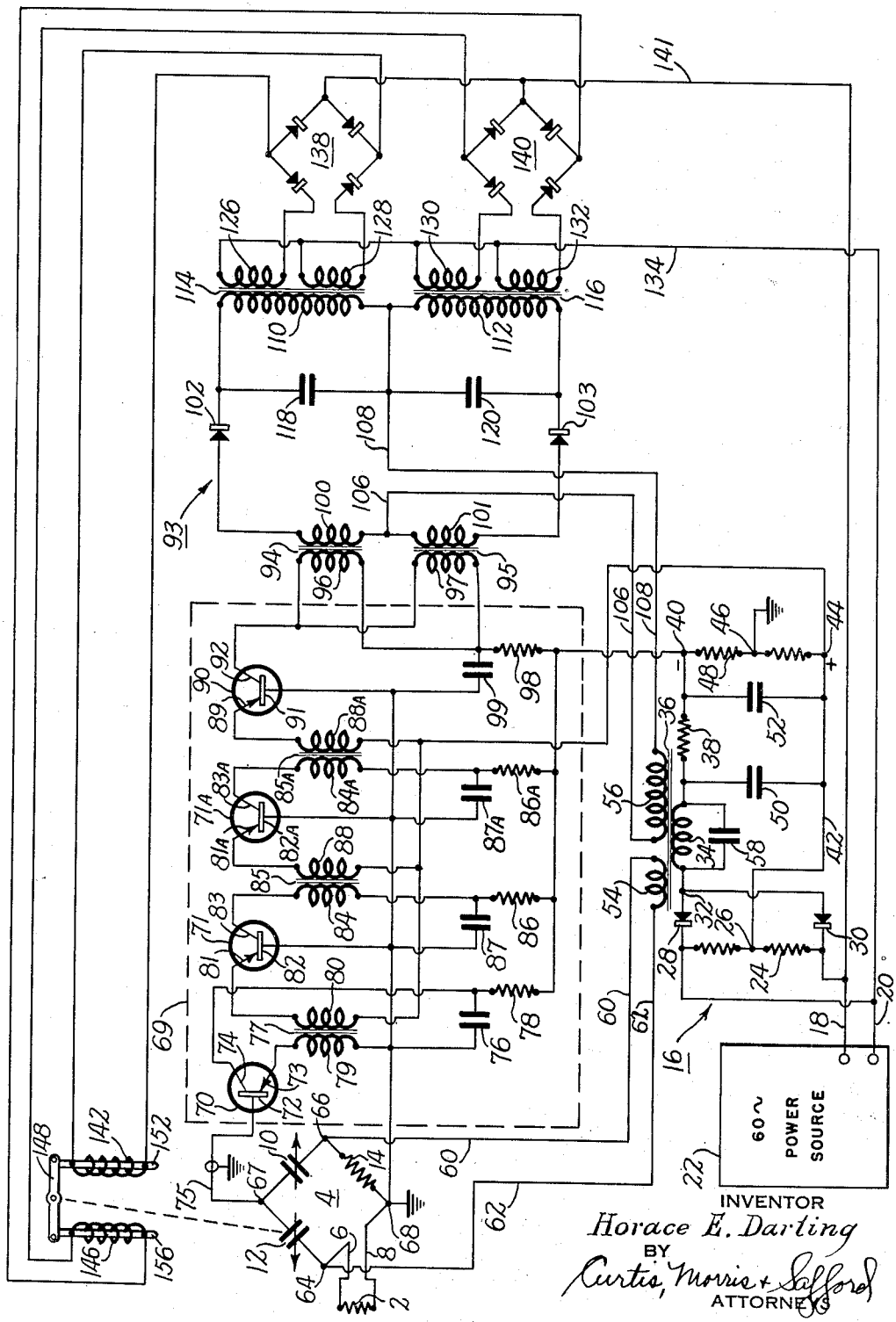
INVENTOR
Horace E. Darling
BY
Curtis, Morris & Safford
ATTORNEYS United States Patent Office 2,782,346
Patented Feb. 19, 1957

2,782,346

MEASURING APPARATUS

Horace E. Darling, North Attleboro, Mass., assignor to The Foxboro Company, Foxboro, Mass.

Application July 16, 1952, Serial No. 299,086

1 Claim. (Cl. 318—21)

This invention relates to measuring apparatus for measuring automatically and precisely the value of conditions such as temperature, pressure, flow, etc. More particularly, it relates to the simplification of such apparatus while at the same time providing a compact rugged unit having high speed of response. This invention is related to the invention disclosed and claimed in applicant's copending application Serial No. 296,227, filed June 28, 1952, now Patent No. 2,653,282.

The use of an alternating current bridge circuit that is rebalanced by means of a condenser has a number of advantages. For example, the armature of a reciprocating type motor can be connected directly to the rebalancing condenser eliminating the need for any speed reducing mechanisms and providing rapid and accurate rebalancing. Such bridge circuits are necessarily of high impedance and usually are energized from a separate oscillator of relatively high frequency. The use of such high frequency energization lowers the effective impedance of the bridge circuit. The present invention avoids the use of a separate high frequency oscillator and permits coupling the energy efficiently from a capacitance-rebalanced bridge circuit to a transistor amplifier even though the input impedance of the transistors is low.

The single figure is a circuit diagram of one embodiment of my invention.

In the illustrated embodiment of the present invention, a resistance bulb forms part of, or is connected to a bridge circuit incorporating an adjustable rebalancing condenser. This bridge circuit is energized at a frequency, for example of 120 cycles per second, equal to twice the power line supply frequency by an efficient compact arrangement which will be described in detail later. The unbalance signal from this bridge circuit is fed through an impedance-matching isolation stage including a transistor and is amplified by successive transistor elements each having an individual impedance-matching arrangement. This amplified signal is fed into a phase detection circuit incorporating magnetic amplification and applied to a solenoid-operated reciprocating motor connected directly to the rebalancing condenser of the bridge circuit.

It is among the objects of this invention to provide a rebalancing measuring system having high efficiency, maximum rebalancing speed, minimum size, good stability, and which does not require a separate oscillator for energizing the bridge circuit.

Other objects, advantages, and aspects of this invention will be in part pointed out in and in part apparent from the following description of a particular embodiment of the invention considered together with the accompanying drawing which shows the schematic diagram of a rebalanceable measuring system incorporating the invention.

A resistance bulb 2 is connected into a balanceable bridge network, generally indicated at 4, by a pair of leads 6 and 8. This bridge network 4 includes a zero-adjusting variable condenser 10, an adjustable rebalancing condenser 12, a resistor 14, and the sensing element 2.

The usual circuits for compensating for changes in the ambient temperature may be provided but have been omitted from the drawing in order to simplify it. Other known means can be included also for changing the range or sensitivity of the system.

This bridge circuit is energized with 120 cycle alternating current from a power supply, generally indicated at 16, which is provided with 60 cycle alternating current power by power mains 18 and 20 from a source indicated in block form at 22. A low resistance voltage divider 24 having a center-tap connection 26 is connected between the two power mains. These power mains 18 and 20 are connected also through half-wave dry rectifiers 28 and 30 to a common terminal 32 which is connected through a winding 34 of inductor-transformer 36 and a series filter resistor 38 to a negative supply terminal 40. The center-tap connection 26 is connected by a lead 42 directly to a positive voltage supply terminal 44. A tap 46 on a voltage divider resistor 48 between the terminals 40 and 44 is connected to the common ground circuit. Two filter condensers 50 and 52 are connected between either end of the resistor 38 and the lead 42 to provide a filtered direct current output.

The winding 34 filters the pulsating current from the rectifiers 28 and 30 but also serves as a transformer winding for energizing two secondary windings 54 and 56. Each of these windings 54 and 56 thus serves as a source of alternating current of twice the power line frequency. A condenser 58 connected in parallel with the winding 34 forms a tuned circuit resonant at the ripple frequency of the power supply, in this example 120 cycles, and thus increases the effectiveness of the transformer 36. The winding 54 is connected by two leads 60 and 62 to the energizing terminals 64 and 66 of the bridge circuit 4.

The unbalance signal appearing at the output terminals 67 and 68 of the bridge circuit 4 is coupled to an amplifier, enclosed within the broken line 69, which makes use of semi-conductor amplifying devices, called transistors.

In order to match the relatively high output impedance of the bridge network to the low impedance of the transistor amplifier circuits and to isolate the bridge circuit from the amplification circuits, a transistor 70 is interposed between the bridge circuit and the first amplifying transistor 71.

The transistor 70 includes a semi-conducting body having a base electrode 72, an emitter electrode 73, and a collector electrode 74. The semi-conducting body may, for example, consist of crystalline germanium or silicon. The base electrode 72 of the transistor is in low resistance or ohmic contact with the crystal and may be a large area electrode. The emitter and collector electrodes 73 and 74 are in rectifying contact with the crystal and may be point contacts or line contacts or they may have a comparatively large area of contact with the crystal.

The unbalance signal from the bridge output terminal 67 is fed through a shielded lead 75 to the base 72 of the transistor 70. The collector electrode 74 is coupled to the common ground circuit through a condenser 76 and thus is maintained at the same A.-C. potential as the other bridge output terminal 68 which is connected directly to the common ground circuit. With this arrangement, the input impedance to the isolation transistor 70 is relatively high and approximately matches that of the bridge network 4. The output signal from the transistor 70 is coupled in a low impedance circuit through a transformer 77 to the transistor 71.

Transistors exhibit relatively wide variations in their characteristics and are sensitive to proper and improper impedance matching.

Furthermore, transistors have a relatively low input impedance in their emitter circuits and a high output impedance in their collector circuits; so that when more than one successive transistor stage is used in a circuit, or when they are operated out of or into other circuit elements of different impedance, an interstage impedance matching device, such as a coupling transformer is required.

In the present circuit, the input and output impedance of each of the transistors is controlled by the selection of the resistance value in the collector circuit which controls the current through the transistor. Each of the transistors is matched to the adjacent impedance coupling circuit. The result is that it is possible to use only one, or sometimes two, standardized impedance couping arrangements or coupling transformers in production, reducing the labor required to build an instrument and materially decreasing the number and types of transformers which must be kept on hand.

In order to control the input and output impedance of the transistor 70, a resistor 78 is connected between the collector electrode 74 and the negative-voltage supply terminal 40. The resistor 78 controls the magnitude of the direct current flowing from the emitter 73 to the collector 74, and this current flow in turn affects the input and output impedances of the transistor 70.

In commercially producing measuring apparatus of this type, the impedances of the individual transistors are matched to standard inter-stage transformers by selecting the resistors in the collector circuits of the individual transistors to secure the maximum output. Thus, the correct value for each transistor is quickly determined. This value may be marked in code on the transistor itself, and a fixed resistor of the correct value inserted permanently into the circuit. Whenever a transistor is removed from the circuit and replaced, the corresponding resistor is also replaced, for each transistor and its series resistance or resistances are treated as a unitary circuit component. Considerable time and labor are saved when any transistor is changed, because it is not necessary to change the interstage transformer in order to obtain a proper impedance match with the replacement transistor, even though tthe characteristics of the replacement transistor may be markedly different from the old transistor.

The primary winding 79 of the transformer 77 is connected between the emitter electrode 73 of the transistor 70 and the common ground circuit. The secondary winding 80 of this transformer is connected between the positive-voltage supply terminal 44 of the power supply 16 and the emitter electrode 81 of the transistor 71. The voltage between the positive terminal 44 and the grounded power supply return terminal 46 may be a small fraction of a volt and the emitter 81 is then biased slightly positive relative to ground.

The base electrode 82 of the transistor 71 is connected to ground; and its collector electrode 83 is connected through the primary winding 84 of a standardized interstage coupling transformer 85 and through a selected resistor 86 to the negative-voltage supply terminal 40. A by-pass condenser 87 is connected from the junction of the winding 84 and the resistor 86 to ground. The value of the resistor 86 is selected to produce maximum power output across the secondary winding 88 of the transformer 85.

The next amplifier stage incorporating a transistor 71A may be identical with the stage just described, except that the value of the resistor 86A may be different from that of the resistor 86 because of the difference in the characteristics of the particular transistors that are used.

The output signal from the secondary winding 88A is fed to the emitter 89 of a transistor 90. The base 91 of this transistor is grounded and its collector 92 is coupled into the phase detector and direct current amplifier, generally indicated at 93, through two interstage coupling transformers 94 and 95. The primary windings 96 and 97 are connected in parallel; one end of the windings is connected to the collector electrode 92 and the other end is connected through a selected resistor 98 to the negative supply terminal 40. A condenser 99 is connected from the junction of the resistor 98 and the transformer windings to ground.

The secondary windings 100 and 101 are connected in series between two half-wave rectifiers 102 and 103 in the phase-detecting circuit. The amplified unbalanced signal appearing across the secondary windings 100 and 101 is of the same frequency as a comparison signal which is supplied from the secondary winding 56 through two leads 106 and 108. These leads are connected to couple the comparison signal between the junction of windings 100 and 101 and the junction of two control windings 110 and 112 of two magnetic amplifiers 114 and 116, which are connected in series between the output electrodes of the half-wave rectifiers 102 and 103. Two filter condensers 118 and 120 are connected respectively in parallel with the windings 110 and 112. The transformers 94 and 95 may be combined into a single unit with a center tapped output if so desired.

Assume that the resistance of the bulb changes to cause the bridge 4 to be unbalanced in one direction so that the amplified unbalance signal appears across the secondary windings 100 and 101 where it is combined with the comparison signal. With one direction of bridge unbalance, the voltage across the secondary winding 100 adds to the comparison voltage, whereas the voltage across the other winding 101 is decreased thereby. This produces a larger potential across the winding 110 than across the winding 112, so that an unbalance direct current is caused to flow through the two series-connected control windings. If the bridge 4 is unbalanced in the opposite direction, the phase of the unbalance signal is reversed relative to the phase-comparison signal from the secondary winding 56. This reverses the direction of the current through the windings 110 and 112. The control winding 110 is connected in a reverse sense with respect to the winding 112 so that the direction of the magnetic control flux within the core of the magnetic amplifier 114 is opposite to that in the amplifier 116. Each of these magnetic amplifiers has two energizing windings as indicated at 126, 128, and 130, 132. One terminal of each of these windings is connected to a common lead 134 that is connected to the alternating current supply line 20. The other ends of the windings 126 and 128 are connected to a four-element bridge rectifier network, generally indicated at 138. The windings 130 and 132 are connected to a bridge rectifier network, generally indicated at 140. The other one of the power mains 18 is connected to the bridge networks circuits 138 and 140 by a lead 141 as shown.

The windings 126, 128, 130, and 132 are all connected so that their turns are in the same sense, thus, assuming that a control current caused by the unbalance of the bridge 4 is flowing in a given direction through the control windings 110 and 112, the cores of the amplifiers 114 and 116 are magnetized in opposite directions relative to the pairs of energizing windings 126 and 128, and 130 and 132, respectively. Thus, during each half cycle of the current from the mains 18 and 20, a relatively large surge of current is allowed to flow alternately through the windings 126 and 128, through the rectifier circuit 138, and a winding 142 of a solenoid motor, generally indicated at 144. But only a relatively small current flows through the windings 130 and 132, the bridge circuit 140, and the other motor winding 146.

The current which flows through the windings 126 and 128 is such that this current flow further increases the magnetic saturation of the core of the amplifier 114, and hence its magnitude is limited by a lower inductance. However, the current which flows through the windings 130 and 132 is reduced, because it acts to decrease the magnetic saturation of the core of the magnetic amplifier 116, and hence is opposed by a larger inductance.

If the direction of the control current is reversed, the current through the energizing windings 130 and 132 is increased and that through the energizing windings 126 and 128 are decreased.

The relative amounts of current which flow through the motor windings 142 and 146 control the position of a pivotally supported beam 148 that is connected at each end to the cores 152 and 156 of the solenoids 142 and 146. The beam 148 is coupled directly to the condenser 12 and adjusts the condenser in such direction as to rebalance the bridge 4, and thus decrease the unbalance signal. The motor 144 may be used also to control suitable indication means, recording means, or control means for the industrial process involved.

The cores 152 and 156 are arranged to extend at all times into the solenoids 142 and 146 sufficiently far to be within the region wherein the pull exerted by the solenoid winding is substantially independent of the core position. These conditions are not difficult to realize in practice, because there is a substantial distance within each solenoid over which the pull is uniform. See, for example, Electrical Engineers' Handbook, Harold Pender, Editor in Chief (John Wiley & Sons., Inc., 1936), Sec. 4–35 and 4–36. Thus, it is clear that no net torque will act on the beam 148 so long as the currents through the windings 142 and 146 are equal, irrespective of the position of the beam 148. Whenever the currents through the windings 142 and 146 become unequal due to an unbalance signal from the bridge network 4, the beam 148 is moved to a different position to rebalance the network 4 and hence to equalize the currents through the windings 142 and 146. Since these currents through solenoids 142 and 146 are again equal, there is no longer any net force on the beam 148, and the motor 144 balances in this new position.

I claim:

A measuring system formed of passive elements and adapted for energization by commercial supply line power without the need for an oscillator to produce alternating-current of a relatively high frequency, comprising, in combination, a high-impedance bridge network having first and second input terminals and first and second output terminals, said bridge comprising a pair of condensers and a pair of resistive elements arranged in the form of a Wheatstone bridge, the ohmic resistance of one of said resistive elements being variable in accordance with changes in a condition to be measured, one of said condensers being adjustable for rebalancing said bridge, a power supply unit arranged to provide both direct-current and alternating-current potentials and adapted to be connected to commercial alternating-current supply line mains, said power supply unit including two half-wave rectifiers arranged to produce uni-directional pulsating current, an inductor-transformer having a primary winding and two secondary windings, said primary winding being connected to said half-wave rectifiers, filter means including a shunt condenser connected to said primary winding for providing a filtered direct-current output, a first pair of wires connecting one of said secondary windings directly to said input terminals of said bridge network to provide said network with alternating-current energy at twice the frequency of said supply line mains, a condenser connected in parallel with said primary winding to tune said transformer to resonance at twice the frequency of said supply line mains, a first transistor for input impedance matching having a base electrode connected to said first output terminal of said bridge network, an interstage transformer having primary and secondary windings, a second pair of wires connecting said interstage transformer primary winding between said second bridge output terminal and the emitter electrode of said first transistor, a multi-stage transistor amplifier having an input circuit coupled to the secondary winding of said interstage transformer and including a second transistor having a base electrode connected to said second output terminal of said bridge circuit, a circuit connected to said power supply filter means for providing direct-current energizing potential to said multi-stage transistor amplifier, a phase-sensitive detector coupled to the output of said multi-stage transistor amplifier, a third pair of wires connecting the other of said secondary windings of said inductor-transformer to said phase-sensitive detector, magnetic amplification means connected to the output of said phase-sensitive detector, and a reciprocating motor having first and second solenoid windings connected to the output of said magnetic amplification means and mechanically linked to said adjustable condenser to rebalance said bridge in response to changes in the ohmic resistance of said one resistive element.

References Cited in the file of this patent

UNITED STATES PATENTS

| 1,908,249 | Hund | May 9, 1933 |
| 2,418,114 | Frankel | Apr. 1, 1947 |
| 2,524,035 | Bardeen | Oct. 3, 1950 |
| 2,602,911 | Wild | July 8, 1952 |
| 2,630,008 | Howe | Mar. 3, 1953 |
| 2,653,282 | Darling | Sept. 22, 1953 |

OTHER REFERENCES

"Wave Forms," M. I. T. Radiation Lab. Series, vol. 19, p. 551, Fig. 15.3.